United States Patent
Yagi et al.

(10) Patent No.: US 6,281,663 B1
(45) Date of Patent: Aug. 28, 2001

(54) BATTERY CHARGING METHOD

(75) Inventors: Kazuhiko Yagi; Takashi Ishikura; Takeshi Sakurai, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/709,578

(22) Filed: Nov. 13, 2000

(30) Foreign Application Priority Data

Nov. 11, 1999 (JP) .................................................. 11-321803

(51) Int. Cl.⁷ .................................................. H01M 10/44
(52) U.S. Cl. .......................................................... 320/150
(58) Field of Search ..................................... 320/124, 125, 320/132, 137, 150, 152, 153

(56) References Cited

U.S. PATENT DOCUMENTS 5,252,906 * 10/1993 Busson ................................. 320/150

* cited by examiner

*Primary Examiner*—Edward H. Tso
(74) *Attorney, Agent, or Firm*—Arent Fox Kintner Plotkin & Kahn, PLLC

(57) ABSTRACT

A reduction in charging time is achieved while suppressing any deterioration in the lifetime of the battery. A battery temperature increase margin is determined from the battery temperature at charge commencement and the upper limit value of the battery temperature. Moreover, the target charging capacity is determined from the initial state of charge at charge commencement and the target state of charge at charge completion. Furthermore, a value of an upper limit of the battery temperature increase is determined from these. Then, the battery charge current maximum value is set by map referral based on the value of an upper limit of the battery temperature increase such that the temperature of the battery during charging does not exceed the upper limit value. A driver performs the battery charging using a charge current value that has been set on the basis of the battery charge maximum value.

3 Claims, 6 Drawing Sheets

BATTERY CHARGING METHOD

BACKGROUND OF THE INVENTION

1. Field of the Invention

The present invention relates to a battery charging method and particularly to a technology for effectively shortening the charge time and suppressing deterioration in the life of the battery.

This application is based on patent application No. Hei 11-321803 filed in Japan, the content of which is incorporated herein by reference.

2. Description of the Related Art

Conventionally, hybrid vehicles that are provided with a motor in addition to an engine as a power source for running the vehicle, and electric vehicles that are provided solely with a motor as a power source for running the vehicle are known.

Because these vehicles drive a motor using electric power supplied from a battery, it is necessary to charge the battery when the remaining battery charge (state of charge) is reduced due to electric discharge.

When charging a discharged battery, in order to safeguard the battery, it is recommended that the charging be carried out for approximately 10 hours at one tenth of the rated capacity (0.1C). Because rapid charging of the battery leads to deterioration of the battery and a reduction in the lifetime thereof, it has not been very common.

In particular, it has been common with electric vehicles to charge the battery using nighttime power for use on the following day.

However, rapid charging of the battery is demanded in cases such as if the vehicle needs to be suddenly used during the night, or in order to recharge the battery after driving in order to continue to drive the vehicle (i.e. in order to extend the distance driven).

In cases such as these, if the charge current is increased excessively, because the allowable temperature during charging (i.e. the upper temperature limit without harming the battery) ends up being reached due to the heat given off by the battery, the charge current cannot be excessively increased. This is because if the allowable temperature is exceeded, the charging efficiency is reduced and it is not possible for the battery to be charged substantially. Alternatively, due to overcharge reaction, the battery temperature suddenly increases which has a deleterious effect on the battery life.

To counter this, battery cooling apparatuses (a cooling fan or the like) for cooling the battery during charging have been considered, however, because the cooling performance is insufficient, it has not been possible to sufficiently radiate the heat generated by the battery charging leading naturally to a limit on the charge current.

Moreover, as is shown in FIG. 8, if the allowable temperature limit during charging is reached, then a process of temporarily stopping the charging, waiting for the temperature to go down, and then starting the charging again has been repeated over and over and, in some cases, this has led to the charge time instead becoming lengthened.

If the charge time is lengthened, in this way, the problem arises that a waiting time is generated in the use of the apparatus and the usability thereof suffers.

SUMMARY OF THE INVENTION

The present invention was conceived in consideration of the above circumstances and it is an object thereof to achieve a reduction in charging time while suppressing any deterioration in the lifetime of the battery.

In order to achieve the above object, the battery charging method of the present invention comprises the steps of: detecting (S2) a battery temperature ($T_{init}$) at the start of the charging; setting a value of an upper limit ($T_{max}$) of the battery temperature during charging; determining (S5) a maximum value ($T_{max}$) for a battery charge current such that the battery temperature (T) during charging does not exceed the value of the upper limit ($T_{max}$) of the battery temperature, based on the battery temperature ($T_{init}$) at the start of the charging and characteristics (in the embodiments, the characteristic view shown in FIG. 2) of battery temperature increase caused by charge current; and charging (S10–S14) the battery (4) based on the maximum value ($I_{max}$) for the battery charge current.

In this structure, because the temperature (T) of the battery during charging does not exceed the upper limit value ($T_{max}$), there is no need for the charging to be temporarily halted in order for the battery to cool down, and any unnecessary temperature increase caused by an overcharging reaction can be prevented. As a result, a reduction in charging time is effectively achieved while any deterioration in the lifetime of the battery is suppressed.

In the above structure it is also possible to determine the maximum value ($I_{max}$) for the battery charge current using the battery temperature ($T_{init}$) at the start of the charging, the battery state of charge at the start of the charging (initial state of charge $SOC_{init}$), the value of the upper limit ($T_{max}$) of the battery temperature, and the battery state of charge at charge completion (target state of charge $SOC_{end}$).

In this structure, not only when a full charge of the battery (SOC=100%) is desired, but even when it is only desired that the battery be charged enough to drive the vehicle (for example, SOC=50%), because it is possible to perform the charging based on the battery charge current maximum value ($I_{max}$) that has been determined using appropriate parameters, it becomes possible to effectively avoid having to temporarily stop the charging as well as overcharging reactions.

Specifically, the step of determining the maximum value for the battery charge current includes the steps of: determining an amount of current (the target charging capacity $\Delta SOC = SOC_{end} - SOC_{init}$) for charging the battery (4) based on the battery state of charge (the initial state of charge $SOC_{init}$ detected by the battery 4) at the start of the charging and the battery state of charge at charge completion (the target state of charge $SOC_{end}$ set by the driver via the panel 1); determining a battery temperature increase margin ($\Delta T = T_{max} - T_{init}$) from the battery temperature ($T_{init}$) at the start of the charging and the value of the upper limit ($T_{max}$) of the battery temperature; determining a value of an upper limit ($\Delta T/\Delta SOC$) of the battery temperature increase per unit of charge amount from the amount of current ($\Delta SOC$) for charging the battery and the battery temperature increase margin ($\Delta T$); and determining the maximum value for the battery charge current (by map referral using FIG. 2) based on the value of the upper limit ($\Delta T/\Delta SOC$) of the battery temperature increase per unit of charge amount and an amount of a decrease in the battery temperature caused by a battery cooling device (self-cooling plus the fan 5).

DETAILED DESCRIPTION OF THE PREFERRED EMBODIMENTS

The embodiments of the present invention will now be described using the drawings.

Figure 6:
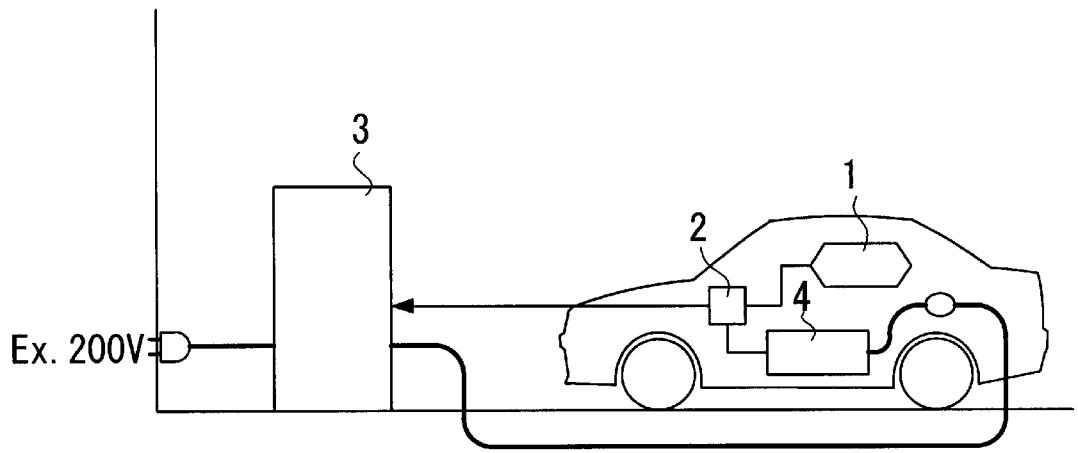
FIG. 6 is an exterior view showing the state when a battery is charged.
Figure 7:
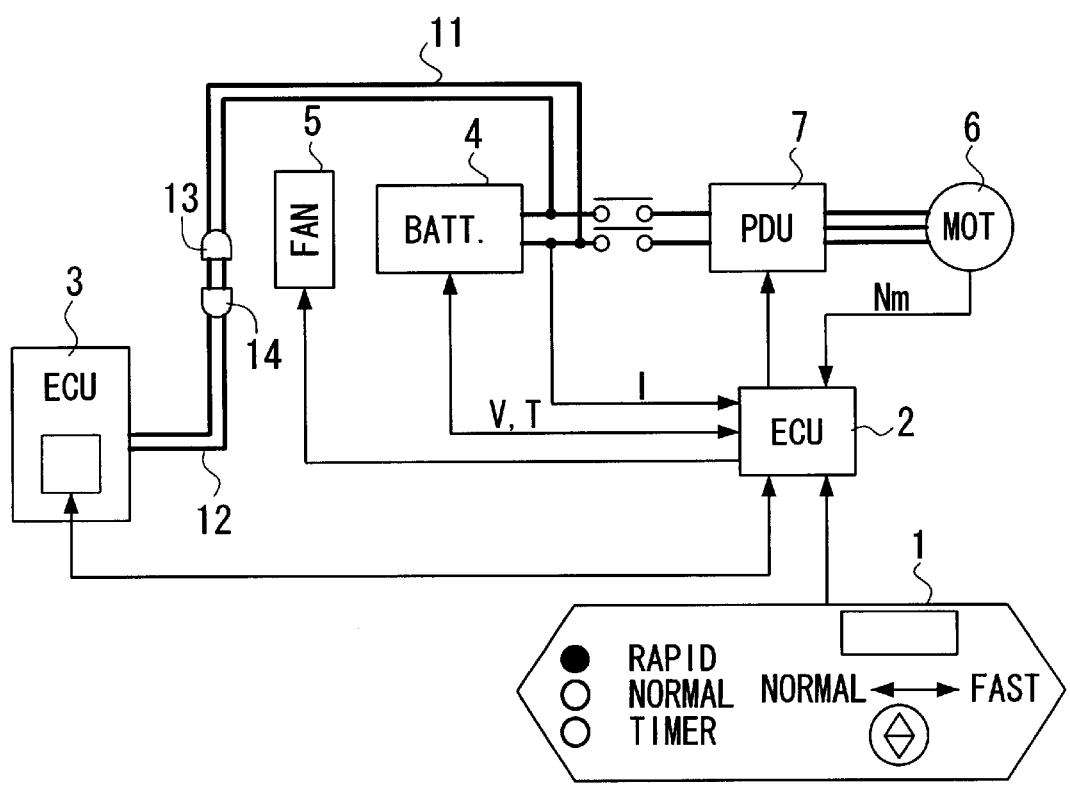
FIG. 7 is a diagram of the circuit formed between a charger and a vehicle.
Figure 8:
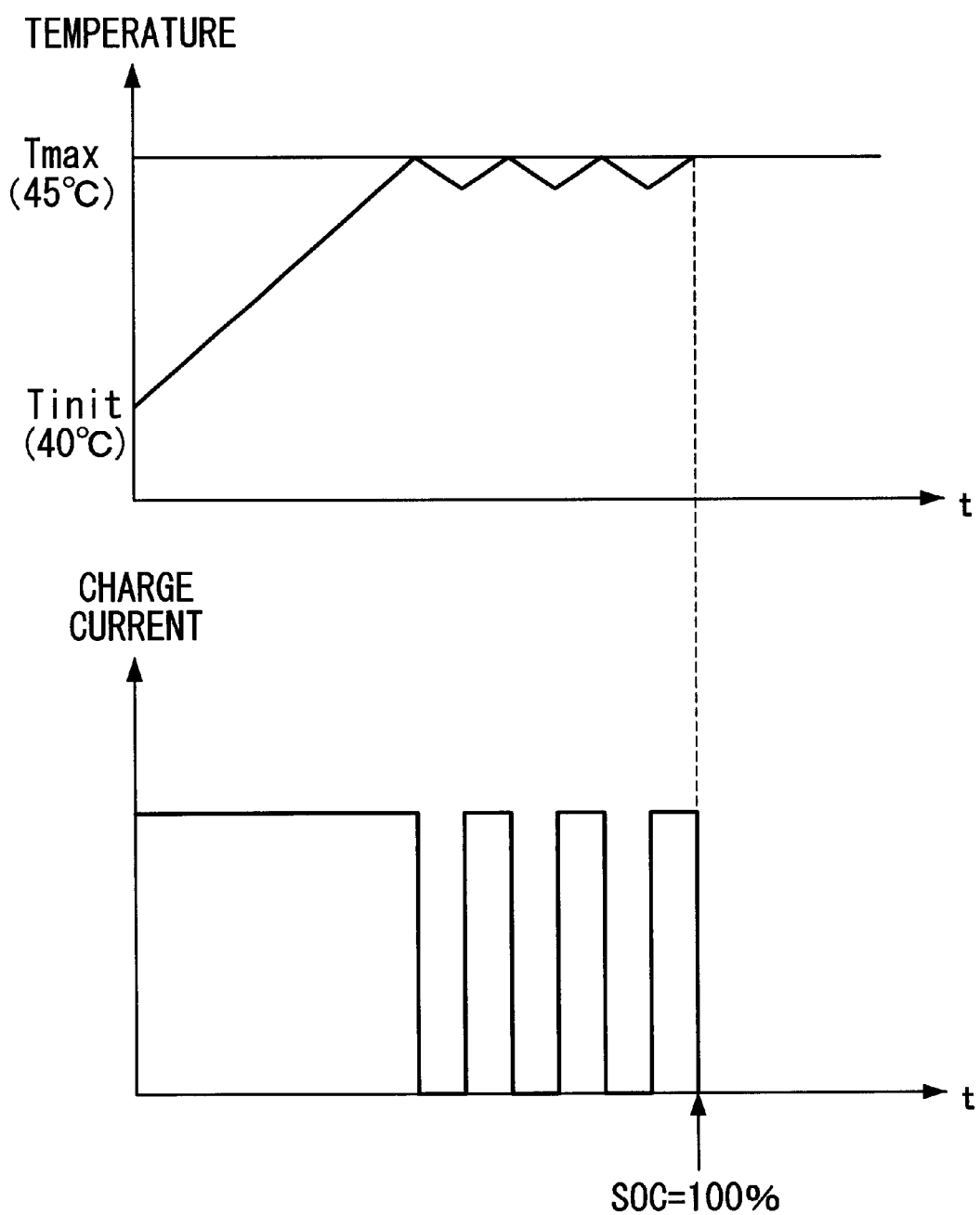
FIG. 8 is a view showing the relationship between the charge current and the temperature increase when a battery is charged until it is fully charged in a conventional example of a battery charging method.

FIG. 6 is an exterior view showing the state when the battery of a vehicle provided with a motor as a power source for driving is charged. FIG. 7 is a diagram of the circuit formed between the charger and the vehicle.

In these drawings, the symbol 1 denotes an operating panel. The driver is able to select an optional charge mode from among "rapid charge", "normal charge", and "timer charge" by operating this panel 1.

"Rapid charge" is the charge mode for when it is desired that the charge be completed in a short time, for example, when charging is performed at a charge current of 1C to 3C (one to three times the rated capacity).

"Normal charge" is the normally used charge mode, for example, when charging is performed for approximately 10 hours at a charge current of 0.1C.

"Timer charge" is the charge mode used when it is desired that charging be completed at night when power charges are low, or in readiness for a departure time.

An ECU 2 is connected via signal wire to the panel 1, the charger 3, a battery (BATT) 4, a fan (FAN) 5, a motor (MOT) 6, and a power drive unit (PDU) 7. The ECU 2 receives inputs such as the charge mode input by the driver using the panel 1, the charge capacity detected by an unillustrated voltage sensor, the battery temperature detected by an unillustrated temperature sensor, feedback of the charge current detected by an unillustrated current sensor, and the number of motor revolutions detected by an unillustrated revolution sensor. The ECU 2 also sends control instructions to the power drive unit 7, the fan 5, and the charger 3 and controls the operation of these devices.

For example, the driving of the motor 6 is performed by the power drive unit 7 receiving control instructions from the ECU 2.

A high pressure based battery 4 for receiving electric energy and the motor 6 are connected to the power drive unit 7.

The battery 4 is formed, for example, by connecting a plurality of cells in series in a single module and then connecting a plurality of these modules together in series, and can be force cooled by the fan 5.

The charging of he battery 4 is performed with a vehicle cable 11 extending from between the battery 4 and the power drive unit 7 and a charger cable 12 extending from the charger 3 connected via connectors 13 and 14.

When performing the charging, it is possible to select a charge mode from any one of the three modes described above, however, the description is of when the rapid charge mode, which relates directly to the present invention, is selected.

Figure 1:
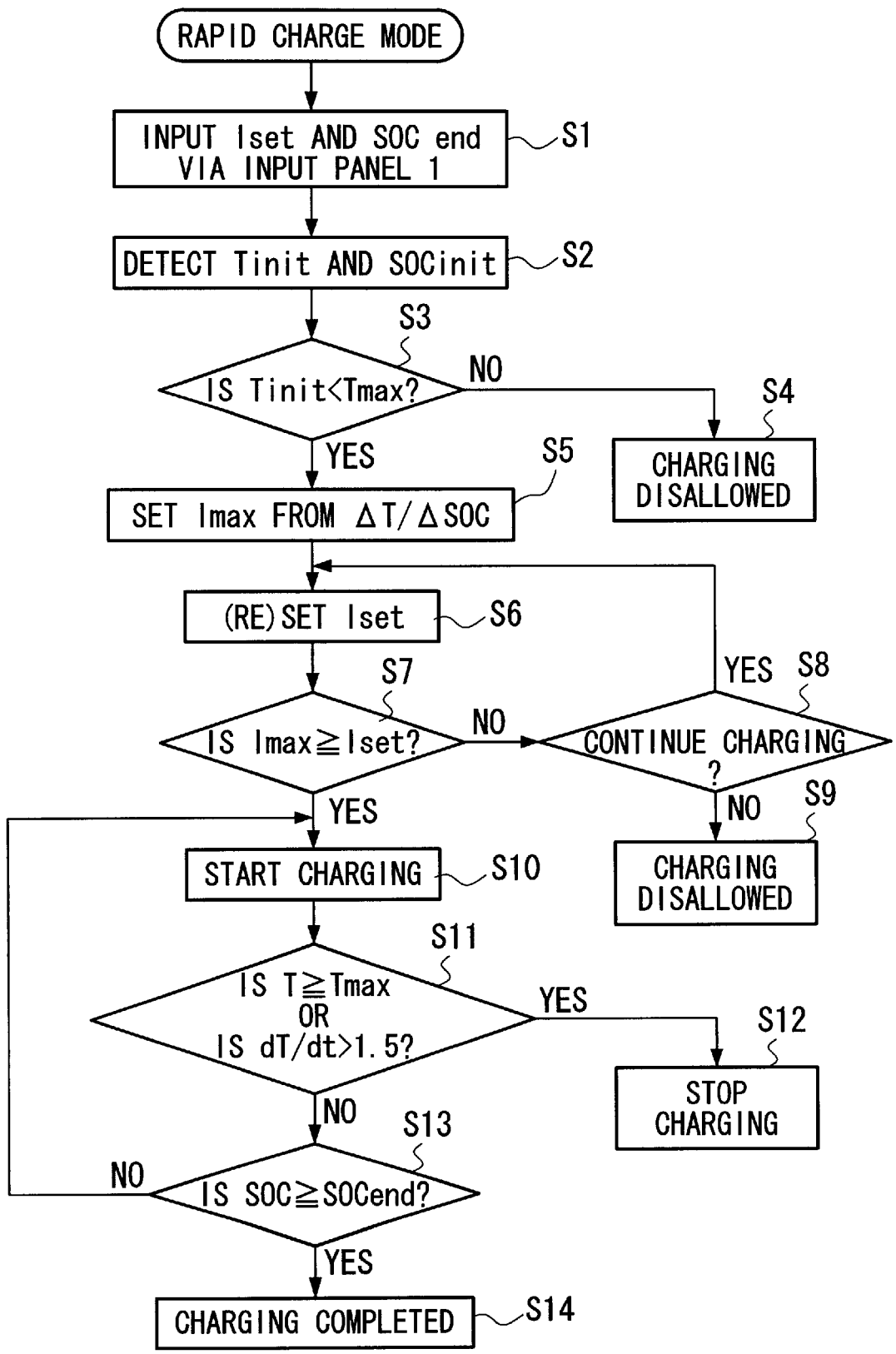
FIG. 1 is a flow chart showing an embodiment of the battery charging method according to the present invention.

The flow chart in FIG. 1 shows the flow of processing when the rapid charge mode is selected on the panel 1 shown in FIG. 7 by the driver.

In step S1, the driver uses the panel 1 shown in FIG. 7 to input in accordance with the type of use such as whether the driver wishes to fully charge the battery (100%) or whether the driver wishes to just charge the battery sufficiently to be able to drive the vehicle (50%, for example), and a target state of charge SOCend.

Because the battery is generally charged to full charge (100%), it is possible to omit the input in that case. When the rapid charge mode is selected, the charge current Iset is also input.

In step S2, the ECU 2 detects the temperature of the battery Tinit at the start of the charging as well as the initial state of charge SOCinit from the battery 4.

In step S3, it is determined whether or not the battery temperature Tinit detected in step S2 and the upper limit value Tmax of the battery temperature T during charging meet the condition, Tinit<Tmax. Note that the upper limit value Tmax of the battery temperature refers to the maximum temperature without the battery being damaged and may be appropriately set according to the type of battery 4 and stored in unillustrated memory.

If the result of the determination in step S3 is NO, the flow proceeds to step S4 where the ECU 2 sends a control instruction to the effect that the charger 3 is not allowed to proceed with the charging.

The reason for this is that if the charging is commenced in this state, the battery 4 will be damaged.

If the result of the determination in step S3 is YES, the flow proceeds to step S5.

In step S5, a charge current (i.e. the maximum value Imax of the battery charge current) is determined such that the battery temperature T will be at the upper limit value Tmax when the charging is completed (i.e. when the SOC has reached the target state of charge SOCend).

Specifically, the value of the upper limit ($\Delta T/\Delta SOC$) of the battery temperature increase per unit charge amount (SOC 1%) is determined by dividing the allowable temperature increase when charging, namely, the battery temperature increase margin $\Delta T$ (=Tmax−Tinit) by the target charging capacity $\Delta SOC$ (=SOCend−SOCinit). The charge current corresponding to the value of the upper limit ($\Delta T/\Delta SOC$) of the battery temperature increase is then determined by reference to the map in FIG. 2.

Figure 2:
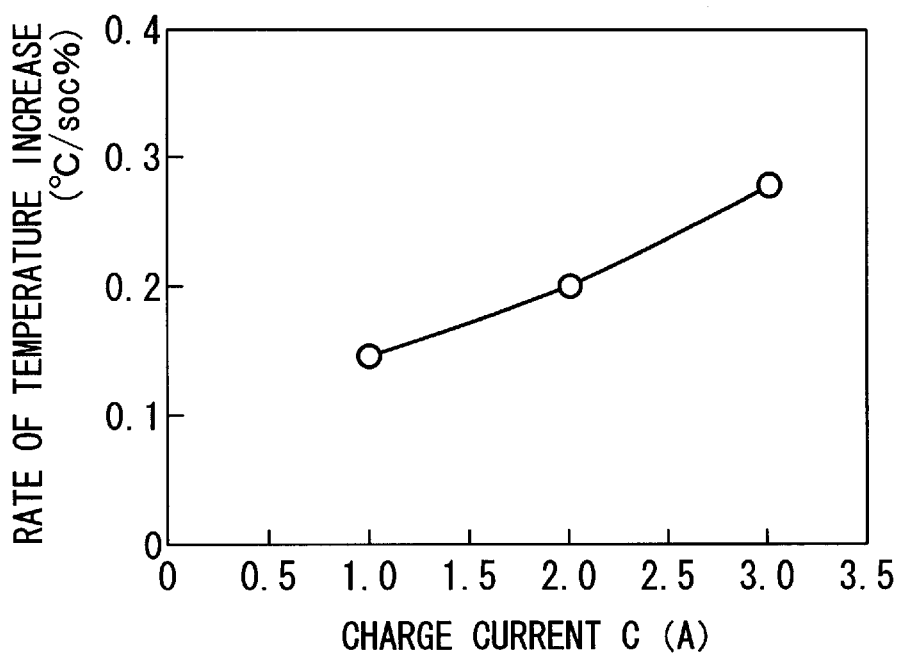
FIG. 2 is a characteristic view of when a fan is operated at 45 W.
Figure 3:
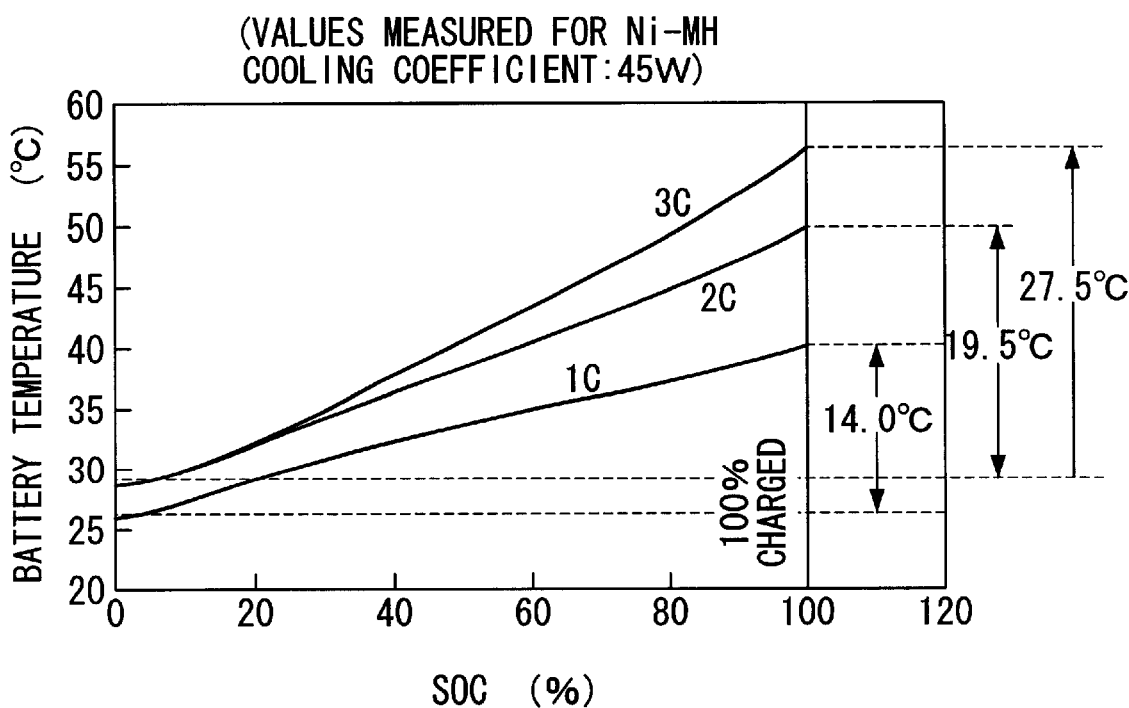
FIG. 3 is an example of the basic data for creating the map data in FIG. 2.

FIG. 3 is a view showing the battery temperature increase when a completely flat (i.e. discharged) Ni—MH battery is charged to the full under a 45 (W) cooling performance from the fan 5. The map in FIG. 2 determines the battery temperature increase ($\Delta T/\Delta SOC$) per SOC 1% charge amount for each charge current from FIG. 3.

Figure 4:
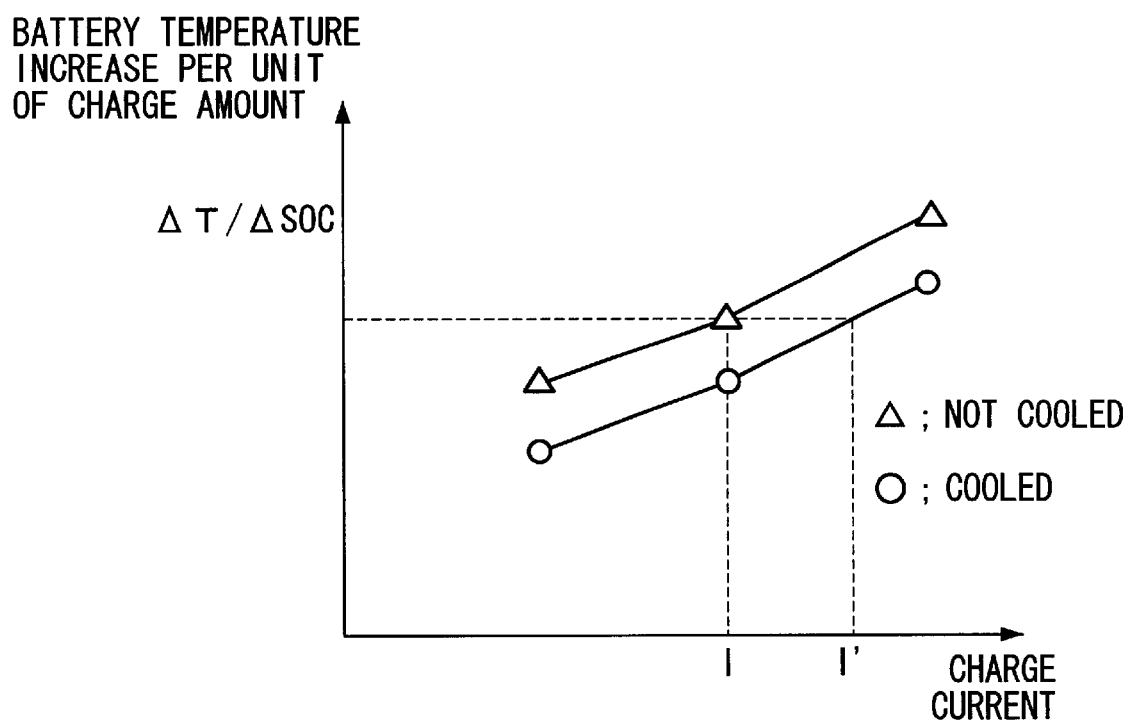
FIG. 4 is a characteristic view of when the fan is operated and when the fan is not operated.

FIG. 2 is a characteristic view of when the fan 5 is operated at 45W. FIG. 4 is a characteristic view of identical measurements made when the fan was being operated and was not being operated.

These characteristic views can be appropriately corrected in accordance with the maximum ability and running state (i.e. whether the fan is running at maximum power or at low power, etc.) of the fan 5.

When the maximum value Imax of the battery charge current is set in step S5, then, in step S6, the driver uses the panel 1 to input the charge current value Iset.

Next, in step S7, it is determined whether or not the maximum value Imax of the battery charge current determined by referring to the map and the charge current value Iset input by the driver via the panel meet the condition Imax≧Iset.

If the result of the determination in step S7 is NO, the flow proceeds to step S8.

In step S8, an error message is displayed or the like on the panel 1 and the driver is urged to decide whether or not to continue the charging.

If the result of the decision by the driver is YES, the flow returns to step S6 where the driver re-inputs the charge current value Iset.

If, however, the result of the decision by the driver is NO, the flow proceeds to step S9 where the ECU 2 sends a control instruction to the effect that the charger 3 is not permitted to carry out the charging.

If the result of the determination in step S7 is YES, the flow proceeds to step S10 where the ECU 2 sends a control instruction to the effect that the charger 3 is permitted to carry out the charging.

The result of this is that the charging of the battery 4 is commenced at the charge current value Iset.

Even after the charging has commenced, the ECU 2 observes the battery temperature T, the time differential value dT/dt of the battery temperature T, and the state of charge SOC.

Namely, in step S11, the ECU 2 determines whether or not the battery temperature T during charging reaches the upper limit value Tmax, or whether or not the time differential value dT/dt of the battery temperature T is less than a predetermined value (for example, 1.5). If either one of these conditions is established (i.e. if the determination in step S11 is YES), a control instruction halting the charging is sent to the charger 3 and the charging is halted (step S12).

Thus, in the present embodiment, the reason for the observation of the battery temperature T during charging is because the battery characteristics change due to deterioration of the battery lifetime and if a discrepancy occurs between the map data and the actual battery characteristics, then even if the charge current value Iset is equal to or less than the maximum value Imax of the battery charge current set in step S5, sometimes the battery temperature T exceeds the upper limit value Tmax during charging. In this case, if the charging is continued in that condition, there is a deleterious effect on the lifetime of the battery.

Moreover, the reason for the observation of the time differential value dT/dt of the battery temperature T during charging is because, even if the battery temperature T has not reached the upper limit value Tmax, in some cases the state of charge SOC has already reached 100% of full charge. In this case, if the charging is continued in that condition, there is a deleterious effect on the lifetime of the battery due to overcharging.

In step S11, if the battery temperature T has not reached the upper limit value Tmax (i.e. the determination result is NO), the flow proceeds to step S13.

In step S13, the ECU 2 determines whether or not the state of charge SOC has reached the charge control value, namely, the target state of charge SOCend. If the state of charge SOC has reached the target state of charge SOCend (i.e. the determination result is YES), a control signal is sent to the charger 3 stopping the charging and the charging is completed (step S14).

If, however, the state of charge SOC has not reached the target state of charge SOCend (i.e. the determination in step S11 is NO), the charging is continued and the ECU 2 repeats the processing of step S11 and thereafter while the charging is being continued.

Figure 5:
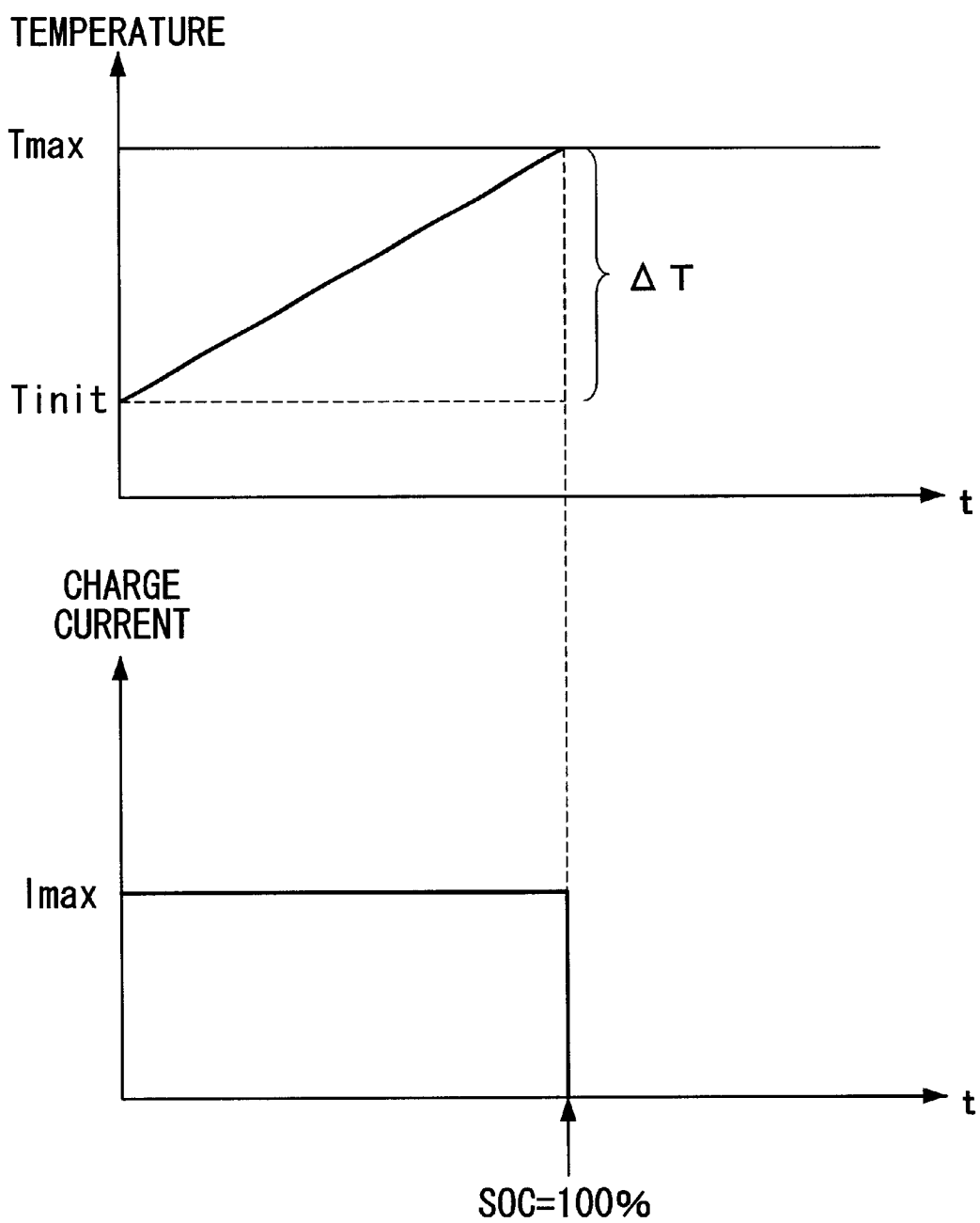
FIG. 5 is a view showing the relationship between the charge current and the temperature increase when a battery is charged until it is fully charged.

As has been described above, in the battery charging method according to the present embodiment, the battery temperature increase margin ΔT (=Tmax−Tinit) is determined from battery temperature Tinit at the start of the charging and the upper limit value Tmax of the battery temperature. Moreover, the target charging capacity ΔSOC (=SOCend−SOCinit) to which the battery 4 should be charged is determined from the initial state of charge SOCinit at the start of the charging and the target state of charge SOCend at the end of the charging. Furthermore, the value of the upper limit (ΔT/ΔSOC) of the battery temperature increase is determined from the above battery temperature increase margin ΔT and the above target charging capacity ΔSOC. By then performing the map reference on the basis of this value of the upper limit (ΔT/ΔSOC) of the battery temperature increase, a maximum value Imax of the battery charge current can be set such that the battery temperature T does not exceed the upper limit value Tmax throughout the duration of the charging. Moreover, the charging is performed at the charge current value Iset set by the driver on the basis of the maximum value Imax (see FIG. 5).

In this way, according to the battery charging method of the present invention, because the battery temperature T does not exceed the upper limit value Tmax throughout the duration of the charging, there is no need for the charging to be temporarily halted in order for the battery to cool down, and any unnecessary temperature increase caused by an overcharging reaction can be prevented.

As a result, a reduction in charging time is effectively achieved while any deterioration in the lifetime of the battery is suppressed.

In particular, in the present embodiment, because the battery temperature T and the time differential value dT/dt of the battery temperature T are observed in step S11 even while the battery is being charged, even if the characteristics of the battery change because of a deterioration in the lifetime thereof or the battery becomes fully charged without the battery temperature T reaching the upper limit value Tmax, because an emergency stopping of the charging is possible immediately (step S12), it is possible to prevent conditions from arising that may have a deleterious effect on the lifetime of the battery.

Note that, in the present embodiment, the maximum value Imax of the battery charge current is determined by referring to a map that uses the value of the upper limit (ΔT/ΔSOC) of the battery temperature increase, however, the present invention is not limited to this, and it is also possible to prepare a calculation formula for the charge current that sets the battery temperature Tinit at the charge commencement, the upper limit value Tmax of the battery temperature, the initial state of charge SOCinit at the charge commencement, and the target state of charge SOCend at the charge completion as parameters, and to use this calculation formula to determine the maximum value Imax of the battery charge current such that the battery temperature T during charging does not exceed the upper limit value Tmax.

Moreover, the cooling capability and the heat capacity may be added to the formula as additional parameters.

Further, in the present embodiment, a description is given of when a battery 4 is fully charged after being fully discharged, however, the present invention is not limited to this and it is also possible to apply the present invention to cases in which charging is commenced when the initial state of charge SOCinit is not zero, or in which the target state of charge SOCend has not necessarily been set to 100%, but to a charge capacity appropriate to the distance to be driven (for example, 50%).

Furthermore, the present invention can be used when charging a battery mounted in a hybrid vehicle as well as a battery mounted in an electric vehicle.

Naturally, it is also possible to apply the present invention when charging a battery other than one used in a vehicle.

As has been described above, according to the battery charging method of the present embodiment, because the temperature of a battery does not exceed an upper limit value throughout the duration of the charging, there is no need for the charging to be temporarily halted in order for the battery to cool down, and any unnecessary temperature increase caused by an overcharging reaction can be prevented.

As a result, a reduction in charging time is effectively achieved while any deterioration in the lifetime of the battery is suppressed.

What is claimed is:

1. A method for charging a battery, comprising the steps of:

detecting a battery temperature at the start of the charging;

setting a value of an upper limit of the battery temperature during charging;

determining a maximum value for a battery charge current such that said battery temperature during charging does not exceed said value of the upper limit of the battery temperature, based on said battery temperature at the start of the charging and characteristics of battery temperature increase caused by charge current; and charging said battery based on said maximum value for the battery charge current.

2. A method according to claim 1, wherein said maximum value for the battery charge current is determined using said battery temperature at the start of the charging, the battery state of charge at the start of the charging, said value of the upper limit of the battery temperature, and the battery state of charge at charge completion.

3. A method according to claim 1, wherein the step of determining said maximum value for the battery charge current includes the steps of:

determining an amount of current for charging the battery based on the battery state of charge at the start of the charging and the battery state of charge at charge completion;

determining a battery temperature increase margin from said battery temperature at the start of the charging and said value of the upper limit of the battery temperature;

determining a value of an upper limit of the battery temperature increase per unit of charge amount from said amount of current for charging the battery and said battery temperature increase margin; and determining said maximum value for the battery charge current based on said value of the upper limit of the battery temperature increase per unit of charge amount and an amount of a decrease in the battery temperature caused by a battery cooling device.

* * * * *